United States Patent
Tamura

(10) Patent No.: US 9,479,021 B2
(45) Date of Patent: Oct. 25, 2016

(54) STATOR OF ROTARY ELECTRIC MACHINE WITH REDUCED CURRENT DENSITY NEUTRAL WIRES

(71) Applicant: DENSO CORPORATION, Kariya, Aichi-pref. (JP)

(72) Inventor: Akito Tamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 165 days.

(21) Appl. No.: 14/165,806

(22) Filed: Jan. 28, 2014

(65) Prior Publication Data

US 2014/0210298 A1 Jul. 31, 2014

(30) Foreign Application Priority Data

Jan. 28, 2013 (JP) ................... 2013-013647

(51) Int. Cl.
*H02K 3/00* (2006.01)
*H02K 3/04* (2006.01)
*H02K 17/00* (2006.01)
*H02K 3/28* (2006.01)
*H02K 3/12* (2006.01)

(52) U.S. Cl.
CPC . *H02K 3/28* (2013.01); *H02K 3/12* (2013.01)

(58) Field of Classification Search
CPC .................. H02K 3/38; H02K 3/00
USPC ................... 310/198, 203, 207, 206
See application file for complete search history.

(56) References Cited

U.S. PATENT DOCUMENTS

2009/0212654 A1* 8/2009 Kaneiwa .......... H02K 3/50
    310/214
2009/0322167 A1 12/2009 Ishizuka et al.
2012/0019081 A1 1/2012 Tamura et al.

FOREIGN PATENT DOCUMENTS

JP    2003-134716 A    5/2003
JP    2005130667 A * 5/2005
JP    2010-011623    1/2010

* cited by examiner

*Primary Examiner* — Jose Gonzalez Quinones
(74) *Attorney, Agent, or Firm* — Nixon & Vanderhye P.C.

(57) ABSTRACT

A stator of a rotary electric machine includes an annular stator core with a plurality of slots arranged in a circumferential direction, a stator winding formed by three phases of phase windings wound around the slots, and neutral wires for commonly connecting ends of the phase windings together in star-connection. Each of the phase windings has two partial windings that are electrically connected in parallel, ends of at least two sets of the partial windings formed by combining two partial windings among the total of six partial windings in different phases and the ends of the neutral wires are connected electrically, and the partial windings connected to both ends of each neutral wire include all the phases.

6 Claims, 6 Drawing Sheets

STATOR OF ROTARY ELECTRIC MACHINE WITH REDUCED CURRENT DENSITY NEUTRAL WIRES

CROSS-REFERENCE TO RELATED APPLICATION

This application is based on and claims the benefit of priority from earlier Japanese Patent Application No. 2013-13647 filed Jan. 28, 2013, the description of which is incorporated herein by reference.

TECHNICAL FIELD

The present disclosure relates to a stator of a rotary electric machine used as a generator or a motor mounted on a vehicle or the like.

BACKGROUND

Conventionally, a rotary electric machine including a rotor disposed rotatably, a stator core having a plurality of slots arranged in a circumferential direction and disposed facing the rotor in a radial direction, and a stator winding wound around the slots of the stator core is generally known as a rotary electric machine used by being mounted on a vehicle.

Then, a stator winding with three-phase (U-phase, V-phase, W-phase) phase windings that each has partial windings electrically connected in double parallel connected in a star connection is disclosed in Japanese Patent Application Laid-Open Publication No. 2010-11623.

Further, the Publication '623 discloses that ends of each partial winding are connected with neutral wires.

In this case, as shown in FIG. 11, among each phase winding connected in double parallel, ends of the two partial windings of the same phase are electrically connected to ends of the neutral wires 26, 27.

Further, in general, a wire having the same cross-sectional area as the partial windings (the same conductor material) is employed for the neutral wires 26, 27.

As the stator winding disclosed in the Publication '623, when the ends of the two partial windings of the same phase are connected to the ends of the neutral wires 26, 27, twice as much current as each of divided windings flows in each of the neutral wires 26, 27.

For example, when the current flows to the V-phase windings from the U-phase windings, assuming i is a current that flow through each partial winding (U1, U2, V1, V2), the current of 2i flows through the neutral wires 26, 27.

Thereby, insulating coatings that surround the outer peripheral surfaces of the neutral wires 26, 27 may be melted due to the temperature of the neutral wires 26, 27 rising excessively, and there is a possibility that insulation failure occurs.

The same problem applies when the current flows in an opposite direction from the V-phase windings to the U-phase windings, between the V-phase windings and W-phase, or between the W-phase windings and the U-phase.

SUMMARY

An embodiment provides a stator of a rotary electric machine in which excessive current is prevented from flowing in neutral wires.

In a rotary electric machine according to a first aspect, the rotary electric machine includes an annular stator core with a plurality of slots arranged in a circumferential direction, a stator winding formed by three phases of phase windings wound around the slots, and neutral wires for commonly connecting ends of the phase windings together in star-connection.

Each of the phase windings has two partial windings that are electrically connected in parallel, ends of at least two sets of the partial windings formed by combining two partial windings among the total of six partial windings in different phases and the ends of the neutral wires are connected electrically, and the partial windings connected to both ends of each neutral wires include all the phases.

According to the present disclosure, each of the phase windings has two partial windings that are electrically connected in parallel, and the ends of at least two sets of the partial windings formed by combining two partial windings among the total of six partial windings in different phases and the ends of the neutral wires are connected electrically.

Thus, the current flows from the partial winding of one phase to the partial winding of another phase directly without passing through the neutral wire between the two partial windings combined in different phases when the current flows from one phase into another phase.

Further, in the present disclosure, since the partial windings connected to both ends of each neutral wire include all the phases, when there is a combination of the partial windings of the same phase, the current that flows is dispersed to both the neutral wires.

Thus, in any case, there is no possibility that excessive current can flow in each neutral wire that would exceed the current flowing through one partial winding.

Therefore, it can prevent the insulating coating of the neutral wires from melting caused by an abnormal temperature rise, and can prevent the insulation failure due to this from occurring.

In the rotary electric machine according to a second aspect, wherein, the neutral wires and the partial windings respectively have curved portions extending in the circumferential direction of the stator core and disposed so as to be aligned in a radial direction with each other, and the curved portions of the neutral wires and the curved portions of the partial windings are fixed by a fixing member.

DETAILED DESCRIPTION OF THE PREFERRED EMBODIMENTS

With reference to the accompanying drawings, hereinafter will be described embodiments of the present disclosure.

First Embodiment

Figure 1:
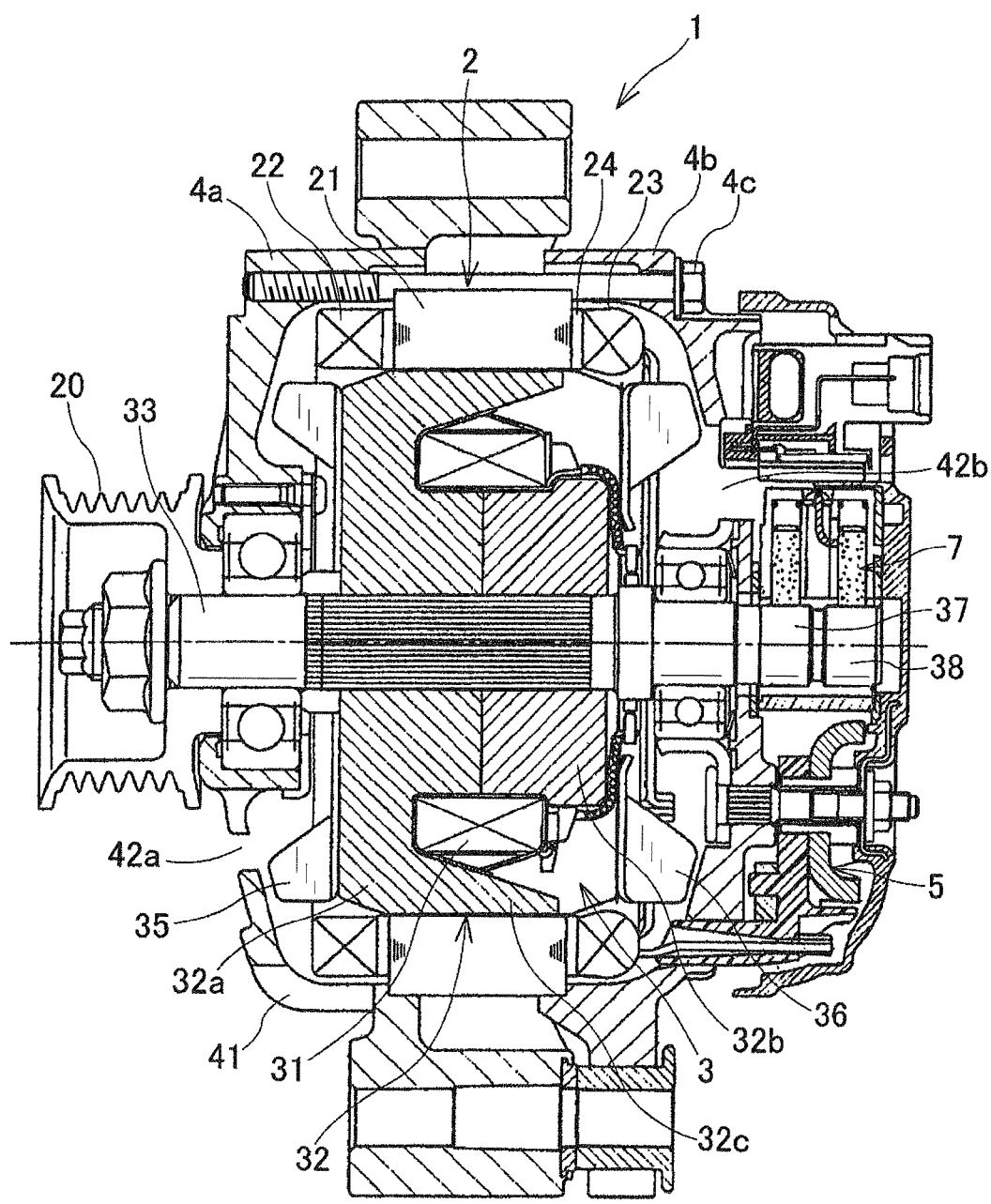
FIG. 1 shows cross-sectional view in an axial direction of a rotary electric machine that has a stator therein according to a first embodiment.

A rotary electric machine 1 according to the present embodiment is one which is used as a vehicle AC generator, and as shown in FIG. 1, is constituted to include a stator 2 that acts as an armature, a rotor 3 that acts as a field, a front housing 4a and a rear housing 4b connected and fixed by fastening bolts 4c to accommodate the stator 2 and the rotor 3 therein, and a rectifier 5 for converting AC power into DC power.

Figure 2:
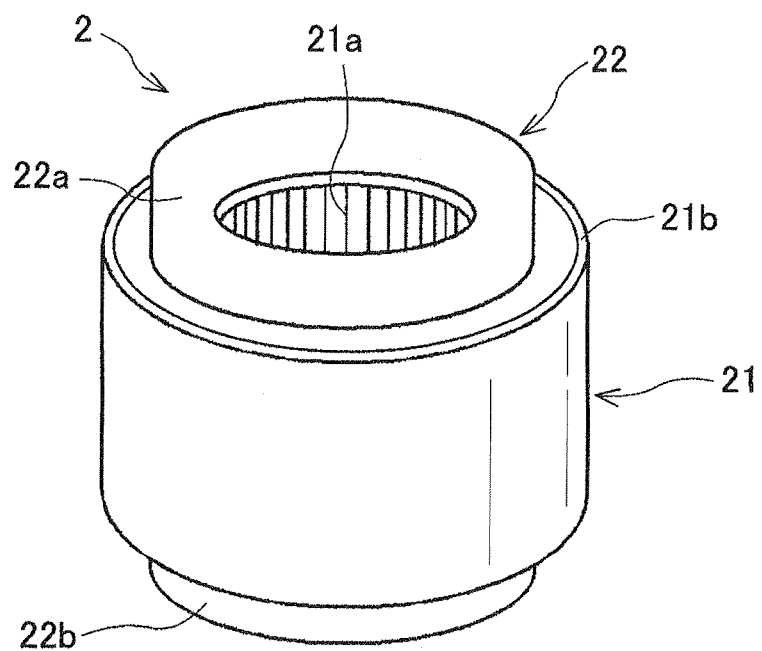
FIG. 2 shows a schematic perspective view of an overall configuration of the stator according to the first embodiment.

The stator 2 has a stator core 21 and a stator winding formed by winding three phases (U-phase, V-phase, W-phase) of phase windings around the stator core 21, as shown in FIG. 2.

The stator 2 is fixed by being sandwiched between the front housing 4a and the rear housing 4b, and is disposed via a predetermined air gap on an outer periphery of the rotor 3. A detailed structure of the stator 2 will be described later.

The rotor 3 rotates together with a shaft 33 rotatably supported by the front housing 4a and the rear housing 4b, and includes a Lundell-type pole core 32 and a field winding 31, as shown in FIG. 1

A pulley 20, which is connected to an engine (not shown) mounted in a vehicle (not shown) via a belt or the like, is fixed to a front end portion (left side in FIG. 1) of the shaft 33.

The Lundell-type pole core 32 is formed by combining a set of a front side pole core 32a and a rear side pole core 32b.

Each pole core 32a, 32b has six claw-shaped magnetic pole portions 32c, and fitted into the shaft 33 so as to sandwich the field winding 31 constituted by winding an insulated copper wire cylindrically and concentrically from both front and rear sides.

In the present embodiment, each of the pole cores 32a, 32b has eight magnetic poles, i.e., the rotor 3 with sixteen poles is formed.

Inlet ports 42a, 42b are provided in an axial end surface (front end surface) of the front housing 4a and an axial end surface (rear end surface) of the rear housing 4b, respectively.

A mixed flow fan 35 for expelling a cooling air sucked from the front side inlet port 42a in axial and radial directions is fixed to a front end surface of the front side pole core 32a by welding or the like.

Similarly, a centrifugal fan 36 for expelling the cooling air sucked from the rear side inlet port 42b in the radial direction is fixed to a rear end surface of the rear side pole core 32b by welding or the like.

Further, outlet ports 41 where the cooling air is discharged are disposed in portions that face the coil end portions of the stator winding 22 protruding from both axial ends of the stator core 21 of the front housing 4a and the rear housing 4b.

Slip rings 37, 38 electrically connected to both ends of the field winding 31 are formed in the rear end portion of the shaft 33, and power is supplied to the field winding 31 from a brush device 7 via the slip rings 37, 38.

The rotor 3 is rotated in a predetermined direction together with the shaft 33 when rotational force from the engine is transmitted to the pulley 20 via a belt or the like in the vehicle AC generator (rotary electric machine) 1 having the above-described configuration.

Under this condition, the claw-shaped magnetic pole portions 32c of the respective pole cores 32a, 32b are energized by applying an excitation voltage to the field winding 31 of the rotor 3 from the brush device 7 via the slip rings 37, 38, and NS magnetic poles are formed alternately along a circumferential direction of a rotation of the rotor 3.

Thereby, it is possible to generate a three-phase AC voltage in the stator winding 22, and it is possible to take out a predetermined direct current from an output terminal (not shown) of the rectifier 5.

Next, details of the stator 2 will be described with reference to FIGS. 2-6.

As shown in FIG. 2, the stator 2 has the annular stator core 21 with a plurality of slots 21a arranged in a circumferential direction and the stator winding 22 wound around the slots 21a of the stator core 21.

The stator core 21 is formed annularly by linking circumferentially a predetermined number of split cores (24 pieces in this embodiment, not shown) divided in the circumferential direction, and has the plurality of slots 21a arranged in the circumferential direction on an inner circumference side thereof.

Each slot 21a is formed so that its depth direction matches the radial direction.

The slots 21a formed in the stator core 21 are formed at a rate of two per one phase of the stator winding 22 relative to the number of magnetic poles of the rotor 3 (8 poles).

In the present embodiment, the number of slots is therefore 48 from 8×3×2=48.

The split cores are formed by a plurality of steel plates that are stacked in the axial direction of the stator core 21.

The overlapping steel sheets of the split cores are fixed by welding.

The stator core 21 is fixed (shape retained) by an outer tube 21b fitted on an outer periphery of the split cores assembled in an annular shape.

The stator winding 22 is formed into a cylindrical shape in a state where a predetermined number of (12 in this embodiment) conductor wires 25 having a predetermined corrugated shape wave-wound along the inner circumference side of the stator core 21.

The stator winding 22 has a straight portion accommodated in the slot 21a of the stator core 21 and a turn portion that connects ends of the two straight portions accommodated in the different slot 21a, respectively, outside the slot 21a.

A first coil end portion 22a is formed by a number of turn portions projecting outwardly from an axial end surface of the stator core 21 in one of sides in the axial direction of the stator winding 22.

In addition, the second coil end portion 22b is formed by a number of turn portions projecting outwardly from an axial end surface of the stator core 21 in another one of sides in the axial direction of the stator winding 22.

Figure 6:
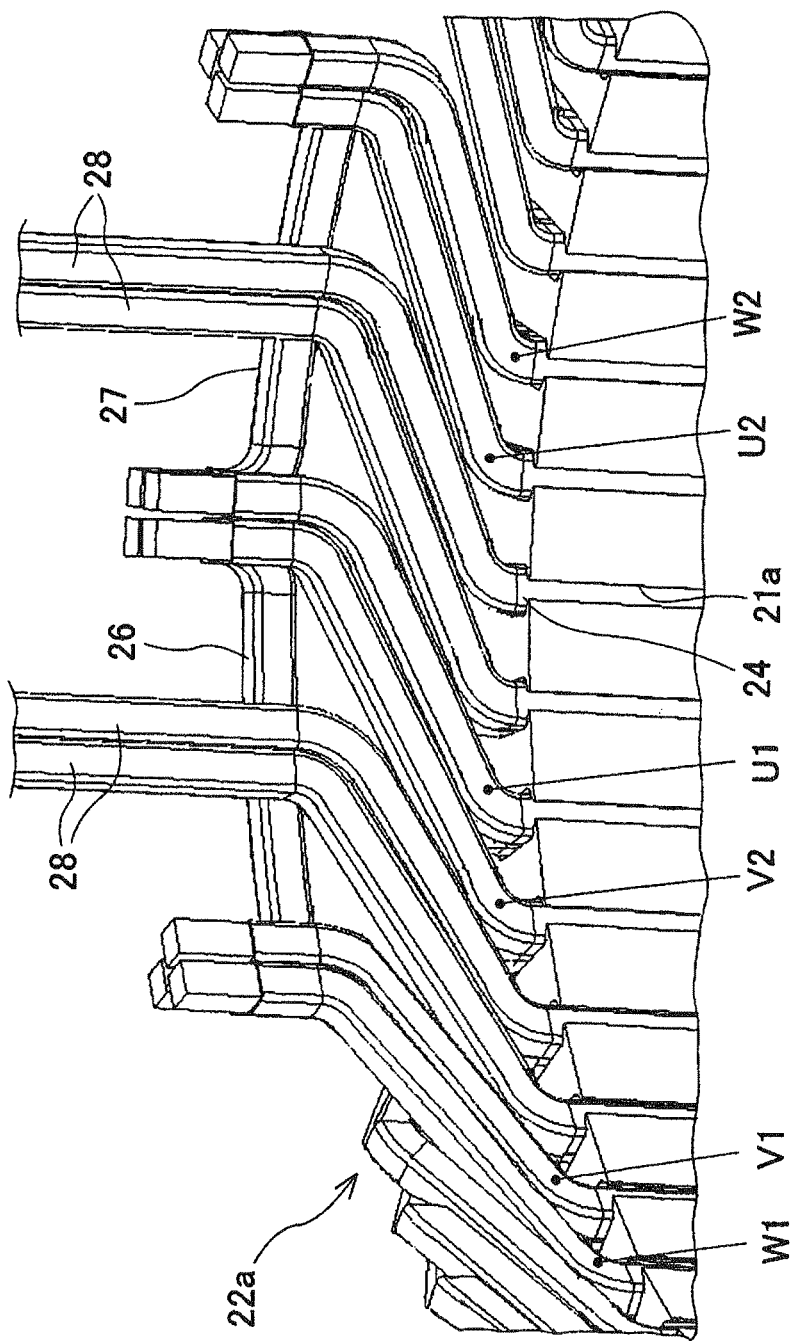
FIG. 6 shows a partial perspective view of a principal part of the stator winding according to the first embodiment.

Note that an insulating sheet 24 that insulates between the stator core 21 and the stator winding 22 is disposed along an inner wall surface of the slot 21a for each slot 21a (refer to FIG. 6).

Figure 3:
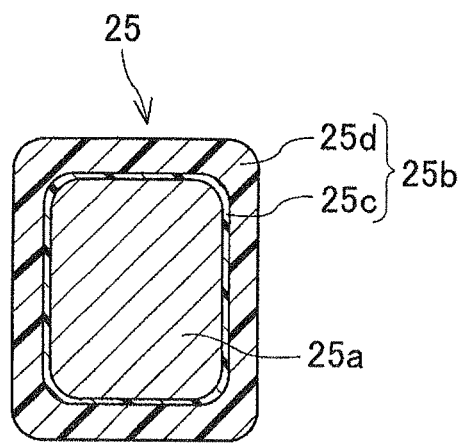
FIG. 3 shows a cross-sectional view of a conductor wire constituting a stator winding according to the first embodiment.

A flat wire made of a copper conductor 25a and an insulating coating 25b that covers an outer periphery of the conductor 25a is employed to the conductor wire 25 constituting the stator winding 22, as shown in FIG. 3.

The insulating coating 25b is constituted by an inner layer 25c that surrounds the outer periphery of the conductor 25a and an outer layer 25d that surrounds an outer periphery of the inner layer 25c.

The thickness of the insulating coating 25b of the combined inner and outer layers 25c and 25d is set between 100 μm and 200 μm.

Thus, since the thickness of the insulating coating 25b formed of the outer layer 25d and the inner 25c is thick enough, there is no need to insulate between the conductor wires 25 by sandwiching the insulating paper or the like between the conductor wires 25.

The outer layer 25d is formed of an insulating material such as nylon, while the inner layer 25c is formed of an insulating material such as a thermosetting resin or polyamide-imide having a higher glass transition temperature than the outer layer 25d.

Thereby, since the outer layer 25d softens faster than the inner layer 25c by heat generated in the rotary electric machine, the outer layers 25d of the conductor wires 25 accommodated in the same slot 21a are thermally bonded together.

As a result, since the conductor wires 25 accommodated in the same slot 21a become rigidified, a mechanical strength of the conductor wires 25 in the slots 21a improves.

Figure 4:
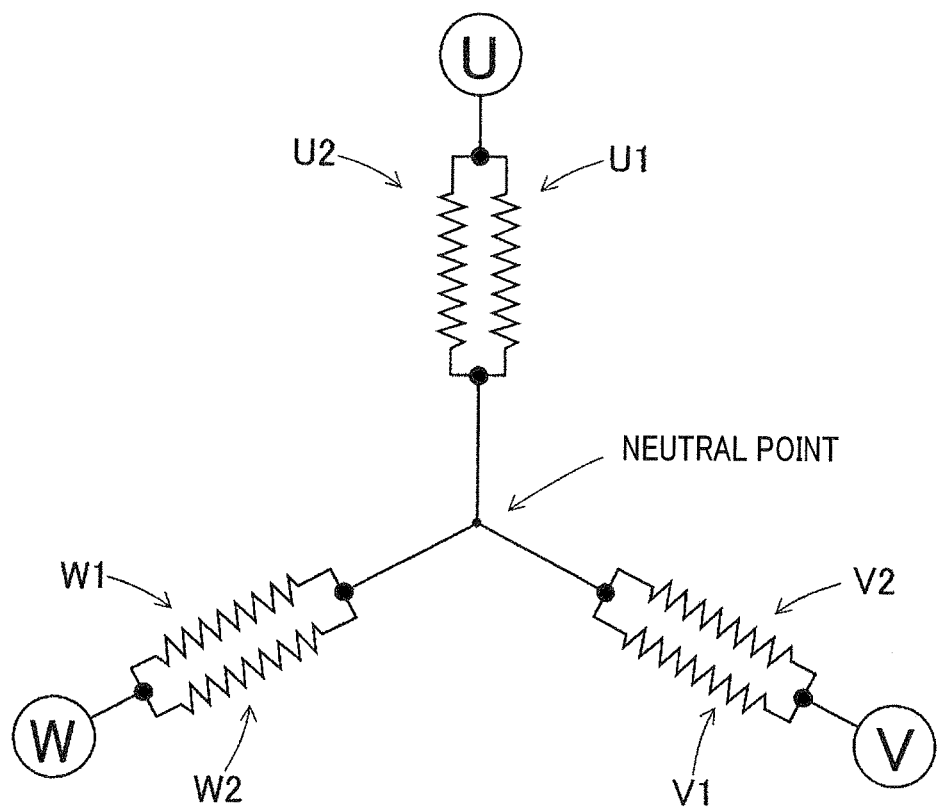
FIG. 4 shows a connecting diagram of the stator winding according to the first embodiment.

The stator winding 22 is connected by star-connecting an end of the winding of each phase made of two partial windings electrically connected in parallel, as shown in FIG. 4.

As shown in FIG. 6, an output line 28 and a neutral point of each phase winding is disposed so as to protrude in the axial direction in the one of the coil end portions 22a.

Ends in the neutral point side of the total of six partial windings U1, U2, V1, V2, W1, W2 constituting each phase winding is commonly connected together by the neutral wires 26, 27.

The neutral wires 26, 27 are formed of the same conductor wire as the conductor wire 25 of the stator winding 22.

Figure 5:
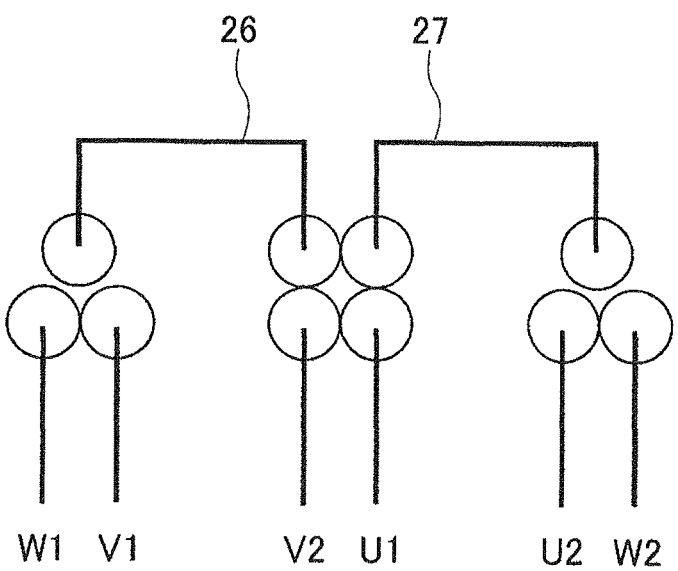
FIG. 5 shows an actual wiring diagram of the stator winding according to the first embodiment.

In the present embodiment, as shown in FIG. 5, the ends of the three sets of the partial windings formed by combining two partial windings in different phases and the ends of the neutral wires 26, 27 are connected electrically.

Specifically, they are combinations of W1 and V1, V2 and U1, and U2 and W2, and the partial windings of two different phases are combined.

Then, W1 and V1, and V2 and U1 are connected by the neutral wire 26, and V2 and U1, and U2 and W2 are connected by the other neutral wire 27.

Thus, the partial windings connected to both ends of each neutral wires 26, 27 include all the phases.

In this case, since the partial windings connected to both ends of the neutral wire 26 are W1, V1, U1, and V2, all the U, V and W phases are included.

Further, since the partial windings connected to both ends of the neutral wire 27 are V2, U1, U2, and W2, all the U, V and W phases are included.

Since each phase winding of the stator winding 22 is connected as described above, no excessive current flows in each neutral wire 26, 27 that exceeds the current flowing through one partial winding when the current flows from one phase into another phase.

That is, when the current flows from the W-phase windings to the V-phase windings, the current flows from W1 to V1 directly without passing through the neutral wire 26, and the current flows from W2 to V2 passing via the neutral wire 27.

Therefore, no excessive current flows in each neutral wires 26, 27 that exceed the current flowing through one partial winding.

In addition, it is the same when the current flows from the V-phase windings to the W-phase windings.

Further, when the current flows from the V-phase windings to the U-phase windings, the current flows from V1 to U1 via the neutral wire 26, and the current flows from V2 to U2 via the neutral wire 27.

Therefore, no excessive current flows in each neutral wire 26, 27 that exceeds the current flowing through one partial winding.

In addition, it is the same when the current flows from the U-phase windings to the V-phase windings.

Further, when the current flows from the U-phase windings to the W-phase windings, the current flows from U1 to W1 via the neutral wire 26, and the current flows from U2 to W2 directly without passing through the neutral wire 27.

Therefore, no excessive current flows in each neutral wires 26, 27 that exceed the current flowing through one partial winding.

In addition, it is the same when the current flows from the W-phase windings to the U-phase windings.

Thus, in any case when a current flows from one phase to another phase, there is no possibility that excessive current flows in each neutral wires 26, 27 that exceed the current flowing through one partial winding.

According to the stator 2 of the present embodiment configured as described above, each phase winding has two partial windings that are electrically connected in parallel.

Among the total of six partial windings, the ends of the three sets of the partial windings formed by combining two partial windings in different phases and the ends of the neutral wires 26, 27 are connected electrically.

Further, the partial windings connected to both ends of each neutral wires 26, 27 include all the phases.

Therefore, it is possible to reduce the density of the current flowing through the neutral wires 26, 27, and can prevent the excessive current from flowing through the neutral wires 26, 27.

Thus, it can prevent the insulating coating of the neutral wires from melting caused by an abnormal temperature rise, and can prevent the insulation failure due to this from occurring.

First Modification

Figure 7:
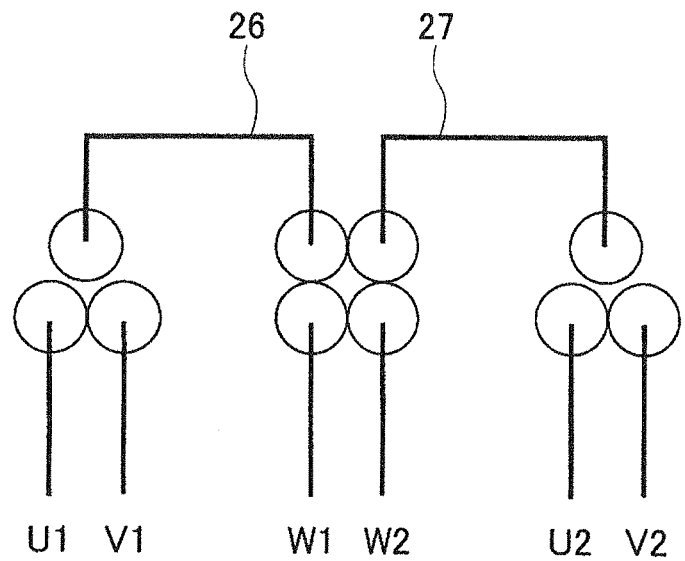
FIG. 7 shows an actual wiring diagram of the stator winding according to a first modification.

Although all of the three sets of the partial windings made of two partial windings are combined with the partial windings in different phases in the first embodiment described above, a set where the ends of two neutral wires 26, 27 are connected may be a combination of the partial windings in the same phase, as shown in FIG. 7.

In this first modification, when the current flows from the U-phase windings to the V-phase windings, the current flows from U1 to V1 directly without passing through the neutral wire 26, and the other current flows from U2 to V2 directly without passing through the neutral wires 27.

Thus, no current flows to both the neutral wire 26, 27. In addition, it is the same when the current flows to the U-phase windings from the V-phase windings.

Further, when the current flows from the V-phase windings to the W-phase windings, the current flows from V1 to the W1 via the neutral wire 26, and the other current flows from V2 to W2 via the neutral wire 27.

That is, in this case, since the current that flows is dispersed to both the neutral wires 26, 27, no excessive current flows in each neutral wires 26, 27 that exceed the current flowing through one partial winding.

In addition, it is the same when the current flows from the W-phase windings to the V-phase windings.

Further, when the current flows from the W-phase windings to the U-phase windings, the current flows from W1 to the U1 via the neutral wire 26, and the other current flows from W2 to U2 via the neutral wire 27.

In this case, since the current that flows is dispersed to both the neutral wires 26, 27, no excessive current flows in each neutral wires 26, 27 that exceed the current flowing through one partial winding as well.

In addition, it is the same when the current flows from the U-phase windings to the W-phase windings.

As described above, the same functions and effects as the first embodiment can be accomplished in the case of the first modified embodiment.

Second Modification

Figure 8:
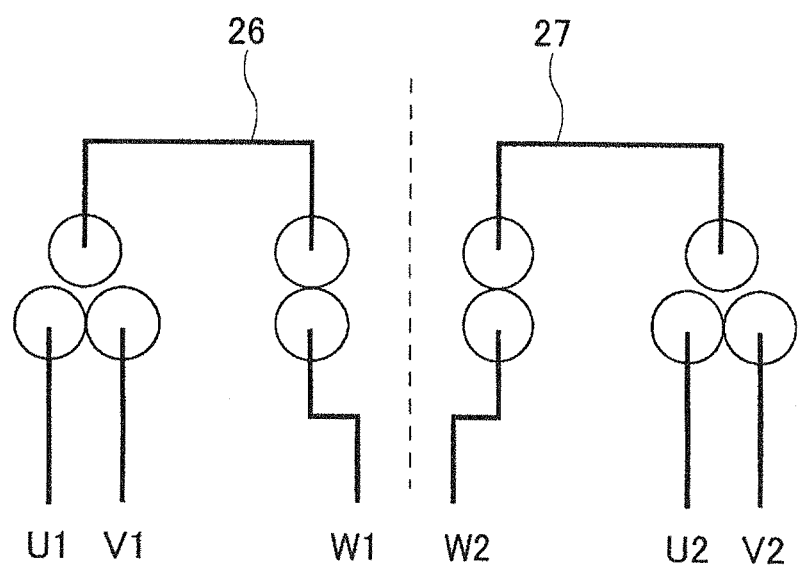
FIG. 8 shows an actual wiring diagram of the stator winding according to a second modification.

When the set where the ends of two neutral wires 26, 27 are connected is the combination of the partial windings in the same phase as mentioned in the first modification above, a junction may be divided into two junctions as a second modification shown in FIG. 8.

In this case, one end of the neutral wire 26 and one end of the partial windings of W1 are connected, and one end of the neutral wires 27 and one end of the partial windings of W2 are connected.

Second Embodiment

The stator 2 of the rotary electric machine according to the second embodiment has the same basic configuration as the first embodiment; however, the configuration of the stator winding 22 is different from that of the first embodiment.

Therefore, components identical with or similar to those in the first embodiment are given the same reference numerals, and structures and features thereof will not be described in order to avoid redundant explanation.

The stator winding 22 of the second embodiment is connected by star-connecting an end of the winding of each phase made of two partial windings electrically connected in parallel, as shown in FIG. 4.

Figure 9:
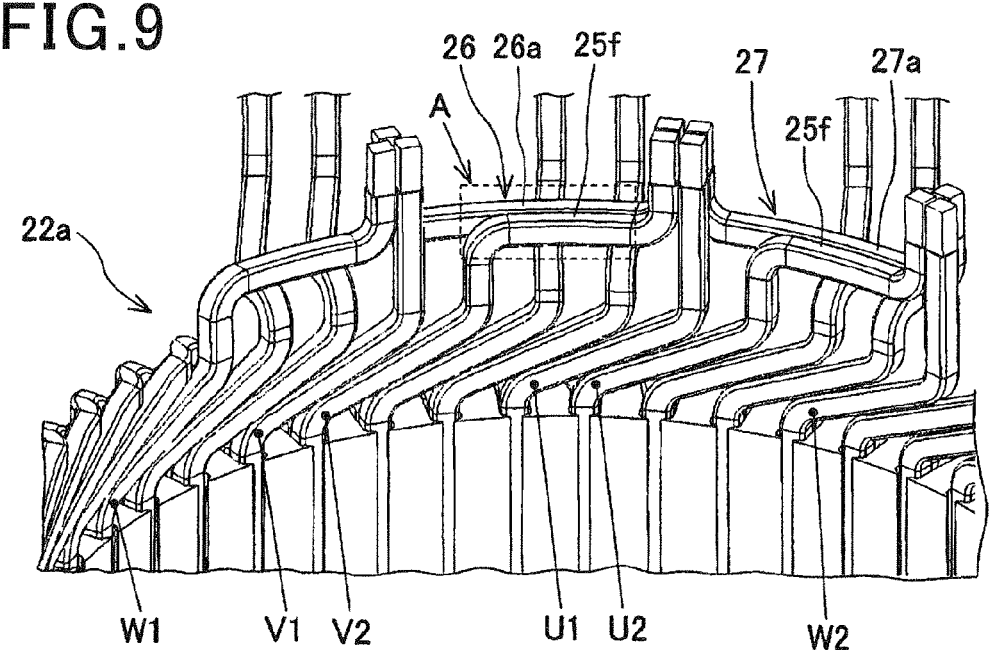
FIG. 9 shows a partial perspective view of a principal part of the stator winding according to a second embodiment.

As shown in FIG. 9, an output line 28 and a neutral point of each phase winding is disposed so as to protrude in the axial direction in the one of the coil end portions 22a.

Ends in the neutral point side of the total of six partial windings U1, U2, V1, V2, W1, W2 constituting each phase winding is connected together by the neutral wires 26, 27.

In the second embodiment, curved portions 25f extending in a circumferential direction of the stator core 21 are provided to the partial windings of the V2 and U2 among the six partial windings U1, U2, V1, V2, W1, W2.

The curved portion 25f of the partial winding of the V2 is disposed so as to be aligned in the radial direction with a curved portion 26a of the neutral wire 26 extending in the circumferential direction thereof.

Figure 10:
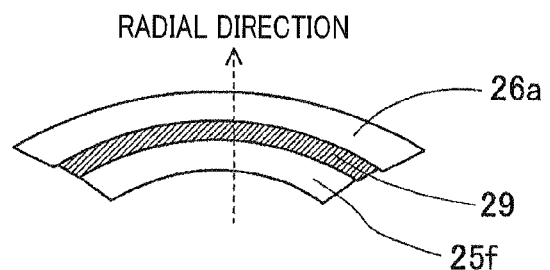
FIG. 10 shows a partial plan view of a part A of the FIG. 9 seen from an axial direction.
Figure 11:
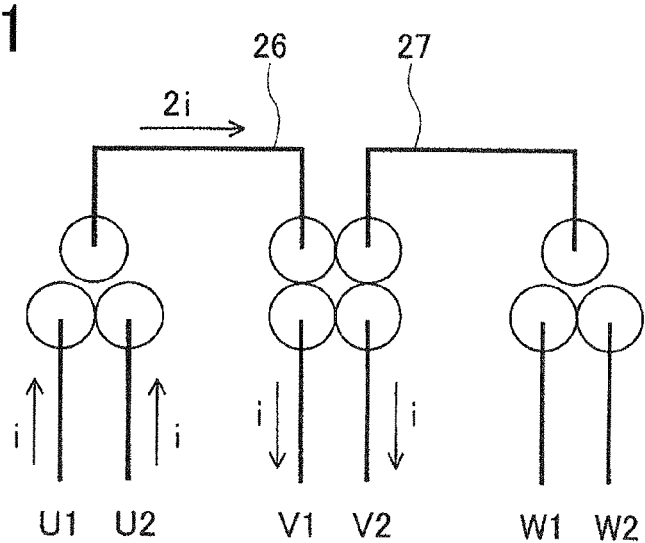
FIG. 11 shows an actual wiring diagram of a conventional stator windings.

As shown in FIG. 10, opposing surfaces facing each other in the radial direction of the curved portion 25f of the partial winding of the V2 and the curved portion 26a of the neutral wire 26 are fixed by a fixing member 29 such as varnish.

Since areas of the opposing surfaces of the curved portion 25f of the partial winding of the V2 and the curved portion 26a of the neutral wire 26 are sufficiently acquired, a sufficient bonding strength by the fixing member 29 is secured.

According to the stator 2 of the second embodiment configured as described above, as in the first embodiment, it is possible to reduce the density of the current flowing through the neutral wires 26, 27, and can prevent the excessive current from flowing through the neutral wires 26, 27.

Thereby, it can prevent the insulating coating of the neutral wires from melting caused by an abnormal temperature rise, and can prevent the insulation failure due to this from occurring.

In particular, in the second embodiment, since the curved portion 25f of the partial winding of the V2 and the curved portion 26a of the neutral wire 26 are disposed so as to be aligned in the radial direction with each other are fixed by the fixing member 29, displacements of the neutral wires 26, 27 during vibration may be suppressed, thus reducing the stress on welded parts of the neutral wires 26, 27.

OTHER EMBODIMENTS

The present disclosure is not limited to the first and second embodiments described above, but the present disclosure may be variously modified without departing from the scope of the present disclosure.

For example, although the partial windings of the stator winding 22 and the neutral wires 26, 27 are fixed by the fixing member 29 such as varnish in the second embodiment, the partial windings and the neutral wires 26, 27 may be bound by straps when other members, such as a thermistor, are bound by straps.

Further, although the stator of the rotary electric machine according to the present disclosure is being applied to an automotive alternator is described as examples in the first and second embodiments, the present disclosure may be applied to a generator, an electric motor, or a rotary electric machine that can be selectively used as either a generator or an electric motor as the rotary electric machine mounted on the vehicle.

What is claimed is:

1. A stator of a rotary electric machine comprising:
an annular stator core with a plurality of slots arranged in a circumferential direction;
a stator winding formed by three phases of phase windings wound around the slots; and
neutral wires for commonly connecting ends of the phase windings together in star-connection; wherein,
each of the phase windings has two partial windings that are electrically connected in parallel;
ends of at least two sets of the partial windings formed by combining two partial windings among the total of six partial windings in different phases and the ends of the neutral wires are connected electrically; and
the partial windings connected to both ends of each neutral wire include all the phases.

2. The stator of the rotary electric machine according to claim 1, wherein,
the neutral wires and the partial windings respectively have curved portions extending in the circumferential direction of the stator core and disposed so as to be aligned in a radial direction with each other; and the curved portions of the neutral wires and the curved portions of the partial windings are fixed by a fixing member.

3. A stator of a rotary electric machine comprising:

an annular stator core with a plurality of slots arranged in a circumferential direction;

a stator winding formed by three phases of phase windings wound around the slots; and neutral wires for commonly connecting ends of the phase windings together in star-connection; wherein, each of the phase windings has two partial windings that are electrically connected in parallel;

ends of at least two sets of the partial windings formed by combining two partial windings among the total of six partial windings in different phases and the ends of the neutral wires are connected electrically so that each of the neutral wires respectively electrically connects between only two partial windings in different phases; and the partial windings of all the phases are connected to the neutral wires.

4. The stator of the rotary electric machine according to claim 3, wherein, the neutral wires and the partial windings respectively have curved portions extending in the circumferential direction of the stator core and disposed so as to be aligned in a radial direction with each other; and the curved portions of the neutral wires and the curved portions of the partial windings are fixed by a fixing member.

5. A stator of a rotary electric machine comprising:

an annular stator core with a plurality of slots arranged in a circumferential direction;

a stator winding formed by three phases of phase windings wound around the slots; and neutral wires for commonly connecting ends of the phase windings together in star-connection; wherein, each of the phase windings has two partial windings that are electrically connected in parallel;

ends of at least two sets of the partial windings formed by combining two partial windings among the total of six partial windings in different phases and the ends of the neutral wires are connected electrically so that a current density each of the neutral wires respectively does not exceed a current density of a connected one of the partial windings.

6. The stator of the rotary electric machine according to claim 3, wherein, the neutral wires and the partial windings respectively have curved portions extending in the circumferential direction of the stator core and disposed so as to be aligned in a radial direction with each other; and the curved portions of the neutral wires and the curved portions of the partial windings are fixed by a fixing member.

* * * * *